(12) United States Patent
Marche

(10) Patent No.: US 8,161,755 B2
(45) Date of Patent: Apr. 24, 2012

(54) HEAT EXCHANGER UNIT FOR AN AIRCRAFT

(75) Inventor: Herve Marche, Roquettes (FR)

(73) Assignee: Airbus Operations SAS, Toulouse (FR)

( * ) Notice: Subject to any disclaimer, the term of this patent is extended or adjusted under 35 U.S.C. 154(b) by 936 days.

(21) Appl. No.: 11/996,663

(22) PCT Filed: Jul. 11, 2006

(86) PCT No.: PCT/FR2006/001711
§ 371 (c)(1),
(2), (4) Date: Aug. 1, 2008

(87) PCT Pub. No.: WO2007/012725
PCT Pub. Date: Feb. 1, 2007

(65) Prior Publication Data
US 2009/0301101 A1 Dec. 10, 2009

(30) Foreign Application Priority Data
Jul. 28, 2005 (FR) ...................................... 05 52351

(51) Int. Cl.
*F02C 6/04* (2006.01)
(52) U.S. Cl. ................................. 60/785; 60/266; 244/57
(58) Field of Classification Search .................. 60/226.1, 60/262, 266, 728, 782, 785, 795; 244/57, 244/58, 53 R, 118.5, 129.1; 165/41, 164–167
See application file for complete search history.

(56) References Cited

U.S. PATENT DOCUMENTS

| | | | |
|---|---|---|---|
| 2,628,482 A | 2/1953 | Burgess | |
| 3,201,938 A | 8/1965 | Zirin | |
| 4,368,778 A | 1/1983 | Nishimura | |
| 4,437,627 A | 3/1984 | Moorehead | |
| 4,576,225 A | 3/1986 | Nassauer et al. | |
| 6,134,880 A | 10/2000 | Yoshinaka et al. | |
| 7,607,308 B2* | 10/2009 | Kraft et al. | 60/785 |
| 7,856,824 B2* | 12/2010 | Anderson et al. | 60/728 |
| 7,926,261 B2* | 4/2011 | Porte | 60/266 |
| 8,024,935 B2* | 9/2011 | Hoover et al. | 60/785 |
| 2003/0218096 A1* | 11/2003 | Marche | 244/118.5 |
| 2007/0034351 A1* | 2/2007 | Marche | 165/41 |
| 2009/0025366 A1* | 1/2009 | Martinou et al. | 60/266 |

FOREIGN PATENT DOCUMENTS

| | | |
|---|---|---|
| DE | 3602608 A1 | 7/1987 |
| EP | 0469825 A2 | 2/1992 |
| FR | 2734319 A1 | 11/1996 |
| FR | 2839948 A1 | 11/2003 |
| WO | 02097353 A1 | 12/2002 |

* cited by examiner

*Primary Examiner* — Louis Casaregola
*Assistant Examiner* — Phutthiwat Wongwian
(74) *Attorney, Agent, or Firm* — Perman & Green, LLP

(57) ABSTRACT

A propulsion system for an aircraft includes a heat exchange unit through which a hot air stream and a cooling air stream flow. The heat exchange unit includes a hot air inlet pipe situated on a rear face of the heat exchange unit, to carry the hot air stream into the heat exchange unit, and a cooling air discharge pipe situated on the rear face of the heat exchange unit to expel the cooling air stream from the heat exchange unit, the hot air inlet pipe and the cooling air discharge pipe being concentric with each other. The hot air stream flows from the rear face forward to a front of the heat exchange unit, then from the front of the heat exchange unit, to a rear of the heat exchange unit, so as to be expelled via the rear face of the heat exchange unit.

12 Claims, 2 Drawing Sheets

HEAT EXCHANGER UNIT FOR AN AIRCRAFT

CROSS REFERENCE TO RELATED APPLICATIONS

This application is the National Stage of International Application No. PCT/FR2006/001711, International Filing Date, 11 Jul. 2006, which designated the United States of America, and which International Application was published under PCT Article 21 (2) as WO Publication No. WO2007/012725 and which claims priority from French Application No. 0552351, filed on 28 Jul. 2005, the disclosures of which are incorporated herein by reference in their entireties.

BACKGROUND

1. Field

The disclosed embodiments relate to a heat exchanger intended to be positioned above a pylon that connects a jet engine to a wing structure of an aircraft, the said heat exchanger being capable, at least partially, of cooling a very hot air stream using a stream of cold air. More specifically, the disclosed embodiments relate to a hot air inlet pipe and a cooling air inlet pipe carrying the hot air stream and the cooling air stream through an exchanger unit. The disclosed embodiments also relate to a propulsion system comprising such a heat exchanger. The disclosed embodiments also relate to an aircraft comprising at least one propulsion system according to the disclosed embodiments.

2. Brief Description of Related Developments

In the field of aeronautics it is known practice to use hot air, bled from the jet engine compressors of an aircraft, in the air conditioning circuits of the said aircraft. Because the air conditioning circuits are intended for the flight deck and passenger cabins, it is necessary to cool this hot air before it can be injected into the said circuits.

To do this, use is made of a heat exchanger in which the hot air stream crosses a stream of cold air bled from the outlet side of a fan belonging to the jet engine. The cold air stream and the hot air stream flow inside a unit of the heat exchanger, generally of parallelepipedal shape, so that a heat exchange can take place.

In general, the hot air stream enters the heat exchanger unit via a front face and flows from front to rear therein, inside hollow plates. The partially cooled hot air stream re-emerges from the unit via a rear face to be directed to the air conditioning circuit. The cold air stream, for its part, enters the heat exchanger unit via a lower face and flows from the bottom up, between the hollow plates, and is then discharged from the unit by openings formed on an upper face, to be removed from the engine pylon.

The cold air stream and the hot air stream are therefore perpendicular to one another in the heat exchanger unit, which means that as they leave the heat exchanger, the exchange of heat has been somewhat inefficient.

The hot air that needs to be cooled is bled from the jet engine situated under the pylon. It is therefore necessary, in order to carry this hot air stream into the heat exchanger, to cause it to pass through the structure of the pylon. In order not to weaken the structure of the pylon it is absolutely essential to maintain its integrity as far as possible, in particular by avoiding having too many pipes passing through it.

Usually, the partially heated cold air is discharged from the jet engine directly. It therefore plays no further part in the thermodynamic cycle of the engine, this leading to a loss of engine performance. This partially heated cold air, as it flows over the pylon that attaches the jet engine to the wing structure of the aircraft, disturbs the aerodynamic flow of the aircraft. What is more, it is necessary to use a material capable of withstanding the high temperatures or to cover the engine cowls with a heatproof coating to prevent the heated cold air from damaging the said cowls. This tends to increase the mass of a propulsion system comprising a heat exchanger. It is also known practice for the stream of cooling air that has flowed through the heat exchanger to be reinjected into the jet stream providing the thrust. To do that, the cooling air discharge pipe has to pass through the pylon to reach the jet engine, and this weakens the structure of the pylon.

SUMMARY

One aspect of the disclosed embodiments is to provide a heat exchanger of low bulk. Another aspect of the disclosed embodiments is to provide a heat exchanger such as this in which the cooling air can, after it has been used, be reinjected into the jet stream providing the thrust, without that having detrimental consequences in terms of the rigidity and mass of the pylon. An additional aspect of the disclosed embodiments is to provide a heat exchanger with high heat exchange efficiency. The disclosed embodiments also seek to improve the performance of a propulsion system comprising a heat exchanger.

To do that, hot air inlet ducting and cold air outlet ducting are both situated on a rear face of the heat exchanger unit. Front and rear are to be understood as meaning with respect to the direction in which the air outside the unit flows. The heated cold air stream is therefore ducted as it leaves the unit and it is possible for this cold air to be reinjected into the air stream that contributes to the thrust of the engine, by carrying it through the jet engine fan duct. Jet engine performance is thus disturbed only a very little by the bleeding of cold air by the heat exchanger. In addition, the engine cowls can be made of composite materials because they are not placed in contact with the heated cold air stream. In so far as the heat exchanger is situated above the pylon, the heated cold air outlet ducting needs to pass through the pylon in order to reach the jet engine. In order to reduce the space occupied by the pipe work in the pylon, provision is made for the ducting carrying the hot air bled from the engine to the heat exchanger unit, and which has to pass through the pylon, and for the heated cold air outlet ducting to be coaxial. A single run of ducting therefore passes through the pylon, the second run of ducting being housed inside the first. A preliminary exchange of heat may take place along coaxial lengths of ducting. Advantageously, the cold air stream and the hot air stream flow parallel to one another through the unit, and at least partially in opposite directions. More specifically, the cold air stream passes through the unit from front to rear, and the hot air stream passes at least once through the unit from the rear forward. The hot air stream can pass along inside pipes running horizontally through the heat exchanger unit. The cold air stream therefore passes freely between the pipes. The pipes through which the hot air passes can form a bow, so that the hot air stream runs in two directions through the unit, these being from the rear forward, then from the front rearward, respectively. In addition, several bows may be superposed in the unit. This then increases the efficiency of the exchange of heat between the cold air stream and the hot air stream, because the surface area for heat exchange in the unit has been increased.

One subject of the disclosed embodiments is therefore a heat exchanger heat exchanger comprising a heat exchange unit and through which a cooling air stream and a hot air stream flow, characterized in that it comprises a hot air inlet pipe situated on the rear face of the unit, to carry the hot air stream into the heat exchange unit, and a cooling air discharge pipe situated on the rear face of the unit to expel the cooling air stream from the heat exchange unit, the said pipes being concentric.

According to exemplary embodiments, the heat exchanger may have all or some of the following additional features:

the cooling air discharge pipe surrounds the hot air inlet pipe.

The cooling air stream and the hot air stream flow horizontally through the unit, parallel to one another, the cooling air stream entering the unit via a front face of the said unit so that the hot air stream and the cooling air stream flow at least partially in opposite directions through the unit.

The heat exchange unit comprises air guides through which the hot air stream flows, the cooling air stream flowing around the said air guides.

The cooled hot air stream is discharged from the heat exchange unit via the front face of the said unit.

The cooled hot air stream is discharged from the heat exchange unit via the rear face of the said unit, the hot air stream flowing from the rear forward then from the front rearward through the unit.

The heat exchanger comprises elbowed air guides situated in the heat exchange unit and through which the hot air stream flows, each air guide passing through the heat exchange unit at least twice.

The heat exchanger comprises a plurality of air guides arranged in pairs, pairs of air guides being superposed in the said unit.

Another subject of the disclosed embodiments is a propulsion system for an aircraft comprising a jet engine, a pylon for attaching the jet engine to a wing structure of the aircraft and a heat exchanger according to the disclosed embodiments, the heat exchanger unit being attached to an upper face of the pylon.

According to some exemplary embodiments the propulsion system may have all or some of the following additional features:

the cooling air discharge pipe passes through the pylon so that the cooling air stream is discharged to the rear of the jet engine.

The cooling air discharge pipe comprises two discharge nozzles positioned under the pylon, one on each side of the jet engine.

The hot air inlet pipe passes through the pylon so as to carry the hot air stream from the jet engine to the rear of the heat exchanger unit, the hot air inlet pipe and the cold air discharge pipe being concentric throughout their passage through the pylon.

A cooling air inlet pipe carrying the cooling air stream from the jet engine to the heat exchanger unit passes above the pylon.

The cooling air inlet pipe bleeds the cooling air stream frontally from the jet engine in a region where the air streams split, this region being situated upstream of the reverser cowls.

The disclosed embodiments also relate to an aircraft comprising at least one propulsion system.

The disclosed embodiments will be better understood from reading the description which follows and from examining the accompanying figures. These are given by way of entirely nonlimiting indication of the disclosed embodiments. The figures depict:

DETAILED DESCRIPTION

Figure 1:
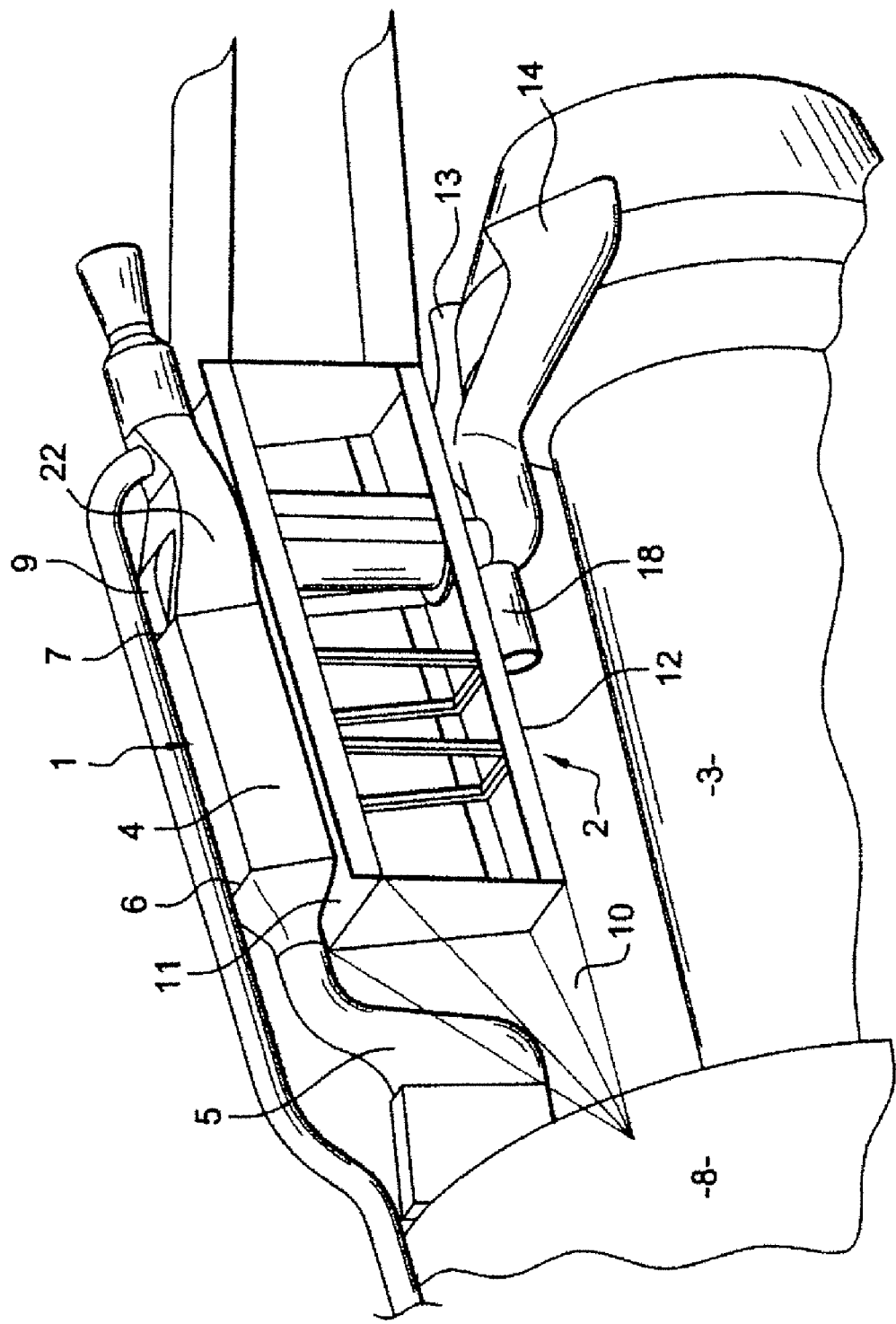
FIG. 1: a partial schematic depiction of a propulsion system comprising a heat exchanger according to the disclosed embodiments.

FIG. 1 shows a heat exchanger 1 positioned on a pylon 2 connecting a jet engine 3 to the wing structure of an aircraft (not depicted).

The heat exchanger 1 comprises a unit 4 of rectangular shape through which a cooling air stream and a hot air stream flow. The cooling air stream enters the unit 4 via a cooling air inlet pipe 5, on the front face 6 of the said unit 4. Front face is to be understood to mean that face of the unit that faces toward the fan 8 of the jet engine 3, opposite to the rear face 7 which faces toward the rear of the jet engine. In the example depicted in FIG. 1, the cooling air stream is bled frontally from the jet engine, in a region where the air streams split, this region being situated immediately after the fan 8. Thus, the cooling air inlet pipe does not pass through the structure of the pylon 2 but passes over the engine mount 10 of the pylon 2. The engine mount 10 is the forward tip of the pylon 2 via which the said pylon 2 is attached to a forward part of the jet engine 3. The cooling air stream could just as easily be bled, more conventionally, laterally from an air flow duct formed between the jet engine 3 and the nacelle cowl (not depicted). In such an instance, the cold air inlet pipe 5 has to execute a turn in order to reach the front face 6 of the unit 4 and possibly pass through the robust structure of the pylon 2. The cold air inlet pipe 5 could just as easily open onto a lateral face of the unit 4, situated on that side of the cowl on which the cold air stream is bled.

As will be described in greater detail later on, the cooling air stream blows freely through the unit 4 between air guides in which the hot air stream that is to be cooled flows. The cooling air stream thus flows from front to rear in the unit 4 and is ducted as it leaves the unit 4 by a cooling air discharge pipe 9 beginning at the rear face 7 of the unit 4. The cooling air discharge pipe 9 passes through the pylon 2 over the entire height of the said pylon 2, to reach the jet engine 3 situated under the pylon 2. The height h is to be understood to mean the dimension of the pylon 2 from an upper face 11 to which the unit 4 is attached to a lower face 12 facing toward the jet engine 3. Once it has passed through the pylon 2, the cooling air discharge pipe 9 splits into two lateral nozzles, these being a left nozzle 13 and a right nozzle 14 respectively. The lateral nozzles 13, 14 are situated one on each side of the vertical plane of symmetry of the jet engine 3 so as to be situated on a left-hand flank and a right-hand flank of said plane of symmetry. The nozzles 13, 14 are directed toward the rear of the jet engine so that the cooling air stream is ejected to the rear of the jet engine 3 with the thrust jet stream. The lateral positioning of the nozzles 13, 14 allows these not to act to the detriment of the region where the pylon 2 is attached to the rear of the jet engine 3.

The hot air stream that is to be cooled is carried into the unit 4 by a hot air inlet pipe 18. The hot air inlet pipe 18 carries the air from the jet engine 3, situated under the pylon 2, as far as the unit 4 situated above the pylon 2, passing through the structure of said pylon 2. The hot air inlet pipe therefore also passes through the pylon 2 over its entire height h. The hot air inlet pipe 18 passes along inside the cold air discharge pipe 9 which means that there is no need to form two holes through the pylon 2.

Figure 2:
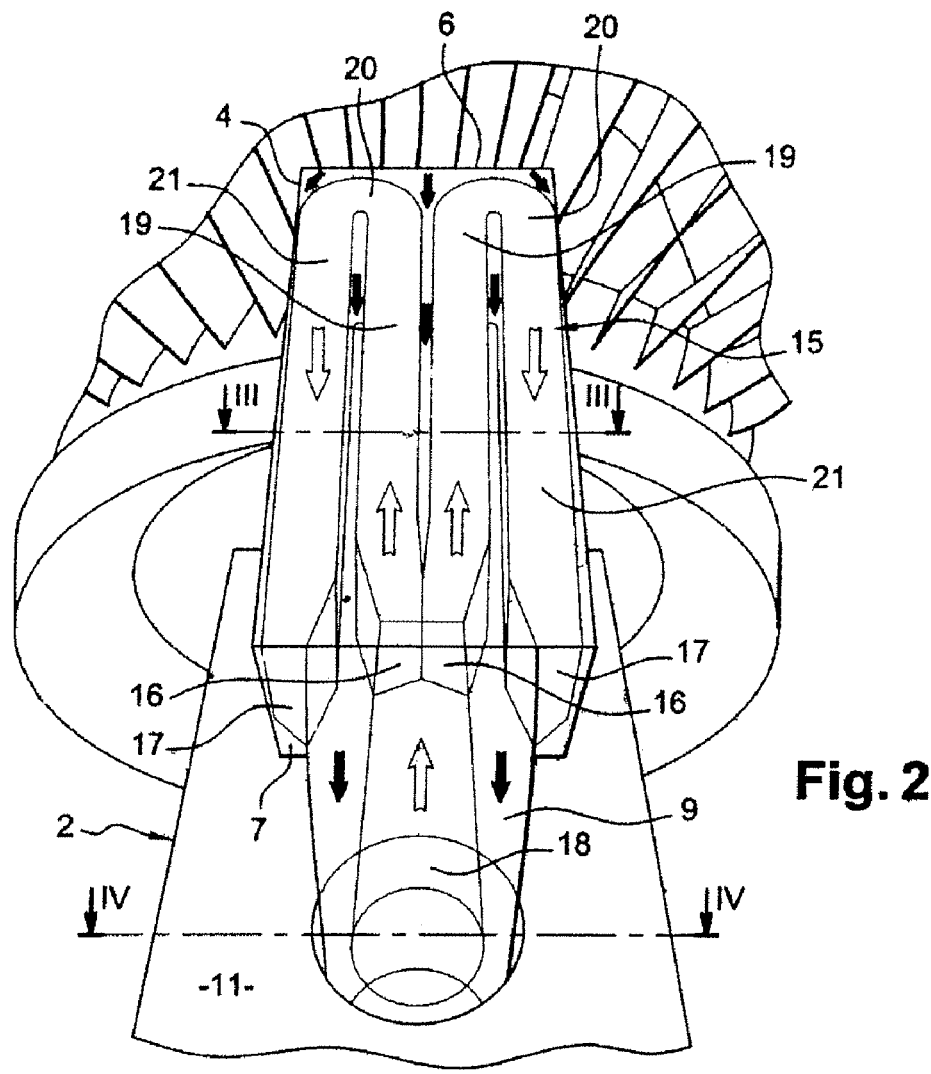
FIG. 2: a rear view of a heat exchanger according to one exemplary embodiment of the disclosed embodiments.

FIG. 2 depicts one particular exemplary embodiment of a heat exchanger 1 according to the disclosed embodiments.

The unit 4 of the heat exchanger 1 comprises air guides 15 through which the hot air stream flows. Each air guide 15 comprises an air inlet 16 situated on the rear face 7 of the unit 4. The air inlets 16 coincide with the hot air inlet pipe 18. A first part 19 of the air guide 15 passes in a straight line from the rear to the front of the unit 4. An elbow 20 of the air guide 15 connects the first part 19 to a second part 21 which passes in a straight line through the unit 4 from front to rear. Thus, the hot air stream passes along the length of the unit 4 twice. An air outlet 17 discharges the cooled hot air at the rear face 7 of the unit 4. In the exemplary embodiment depicted, the air guides 15 have just one single elbow 20 which means that they pass only twice through the unit 4. It is equally possible to provide several elbows 20 so that the hot air stream makes a number of outbound and return paths through the unit 4 before it is discharged. Throughout its passage through the air guides 15, the hot air stream is cooled by contact with the cooling air stream around the air guides 15. Heat exchange is performed by convection, across the wall of the air guides 15. The cooling air stream flows from front to rear through the unit 4, parallel to the hot air stream.

Figure 3:
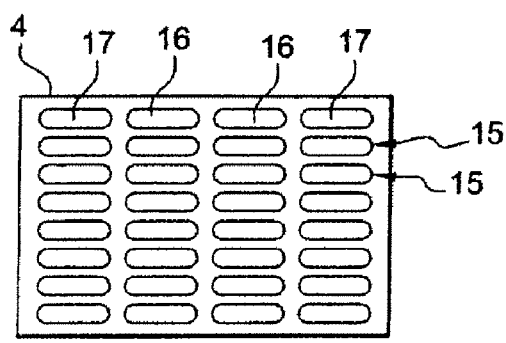
FIG. 3: a section on III-III of FIG. 2.

The air guides 15 are arranged in adjacent pairs in the unit 4. Adjacent pairs is to be understood as meaning pairs situated side by side across the width of the unit 4. Width is to be understood as meaning the dimension of the unit 4 running between the lateral faces of the said unit 4. The pairs of air guides 15 may be stacked upon one another over the height of the unit 4 (FIG. 3). The height of the unit 4 is the dimension between the lower face of the unit 4, in contact with the upper face 11 of the pylon 2, and the upper face of the said unit 4 facing toward the wing structure of the aircraft (not depicted). The air guides 15 need to be stacked in such a way that sufficient space remains between the said air guides 15 for the cooling air stream to be able to infiltrate between them. The air inlets 16 of the air guides 15 are central, that is to say flanked by the air outlets 17 which are situated near the lateral walls of the unit 4. Thus, a doubled-back cooled hot air discharge pipe 22 (FIG. 1) flanks the cooling air discharge pipe 9 at the rear face 7 of the unit 4. Each length of cooled hot air discharge pipe begins at an opposite edge to the rear face 7 of the unit 4. Once past the cooling air discharge pipe 9, the two lengths meet to form a single pipe 22 running along the upper face 11 of the pylon 2.

Figure 4:
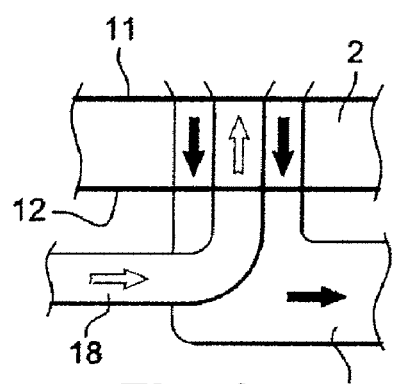
FIG. 4: a section on IV-IV of FIG. 2.

The hot air inlet pipe 18 and the cooling air discharge pipe 9 are both situated on the rear face 7 of the unit 4. Because the air inlets 16 of the air guides 15 are central in the unit 4, whereas the cooling air stream is disseminated throughout the volume of the unit 4, it is advantageous for the hot air inlet pipe 18 to be inserted into the cooling air discharge pipe 9. The hot air stream thus flows through the pylon 2 from the bottom up to reach the unit 4 and the cooling air stream passes through the pylon 2 from the top down to reach the jet stream providing the thrust (FIG. 4). Furthermore, this avoids contact between the hot air inlet pipe 18, the wall of which is at a high temperature, and the internal structure of the pylon 2. The internal structure of the pylon 2 is thus less weakened by the passage of this double pipe work than by the passage of the single hot air inlet pipe of the prior art. Of course, with a different configuration of air guides 15 it is possible to have the hot air inlet pipe 9 surrounding the cooling air discharge pipe 18.

As depicted in FIG. 4, the hot air inlet pipe 18 runs axially through the cooling air discharge pipe 9 from the lower face 12 as far as the upper face 11 of the pylon 2. This then reduces the space occupied by the passage of the pipes 9, 18 through the robust structure of the pylon 2. In addition, from the lower face 12 of the pylon 2 as far as the rear face 7 of the unit 4 there can be an exchange of heat between the cooling air stream and the hot air stream, this corresponding to preliminary cooling of the hot air stream.

In another exemplary embodiment it is possible to have each air guide comprise an even number of elbows 20 so that the air outlet 17 is located on the front face 6 of the unit 4. In such a case, the cooled hot air stream re-emerges from the unit 4 at the front. The cooled hot air stream discharge pipe can then reach the starter duct situated above the unit 4 (FIG. 1). Likewise, straight air guides 15 may be provided, to cause the hot air to flow in just one single direction from the rear of the unit 4 forward. Here again, the cooled hot air stream re-emerges from the unit 4 at the front.

The invention claimed is:

1. A propulsion system for an aircraft comprising a jet engine, a pylon for attaching the jet engine to a wing structure of the aircraft and a heat exchanger comprising a heat exchange unit attached to an upper face of the pylon, and through which a hot air stream and a cooling air stream flow, the heat exchange unit comprising a hot air inlet pipe situated on a rear face of the heat exchange unit, to carry the hot air stream into the heat exchange unit, and a cooling air discharge pipe situated on the rear face of the heat exchange unit to expel the cooling air stream from the heat exchange unit, the hot air inlet pipe and the cooling air discharge pipe being concentric with each other, and in that the hot air stream flows from the rear face forward to a front of the heat exchange unit, then from the front of the heat exchange unit, to a rear of the heat exchange unit, so as to be expelled via the rear face of said heat exchange unit.

2. The propulsion system according to claim 1, wherein the cooling air discharge pipe surrounds the hot air inlet pipe.

3. The propulsion system according to claim 1, wherein the cooling air stream and the hot air stream flow horizontally through the heat exchange unit, the cooling air stream entering the heat exchange unit via a front face of the heat exchange unit so that the hot air stream and the cooling air stream flow at least partially in opposite directions through the heat exchange unit.

4. The propulsion system according to claim 1, wherein the heat exchanger unit comprises air guides through which the hot air stream flows, the cooling air stream flowing around the air guides.

5. The propulsion system according to claim 4, wherein the air guides are elbowed, each air guide passing through the heat exchange unit at least twice.

6. The propulsion system according to claim 4, wherein the air guides are arranged in the heat exchange unit in pairs, the pairs of air guides being superposed in said heat exchange unit.

7. The propulsion system according to claim 1, wherein the cooling air discharge pipe passes through the pylon so that the cooling air stream is discharged to a rear of the jet engine.

8. The propulsion system according to claim 7, wherein the cooling air discharge pipe comprises two discharge nozzles positioned under the pylon, one on each side of the jet engine.

9. The propulsion system according to claim 1, wherein the hot air inlet pipe passes through the pylon so as to carry the hot air stream from the jet engine to the rear of the heat exchange unit, the hot air inlet pipe and the cold air discharge pipe being concentric throughout their passage through the pylon.

10. The propulsion system according to claim 1, wherein a cooling air inlet pipe carrying the cooling air stream from the jet engine to the heat exchange unit passes above the pylon.

11. The propulsion system according to claim 10, wherein the cooling air inlet pipe bleeds the cooling air stream frontally from the jet engine in a region where the hot air and the cooling air streams split, the region being situated upstream of reverser cowls of the jet engine.

12. An aircraft comprising at least one propulsion system according to claim 1.

* * * * *